May 10, 1932.   J. SKOGMARK   1,857,884
PRECIPATATING APPARATUS AND PROCESS
Filed Nov. 3, 1928
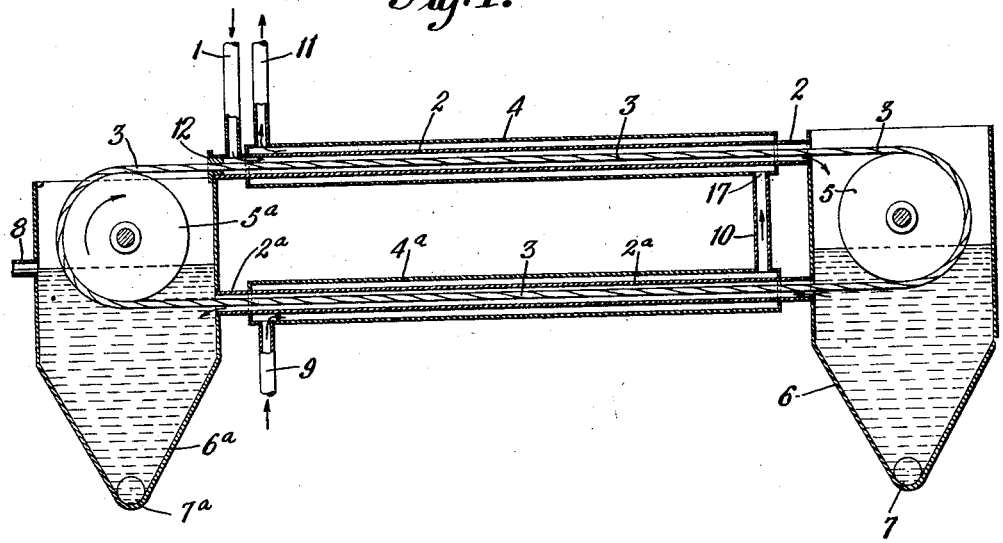
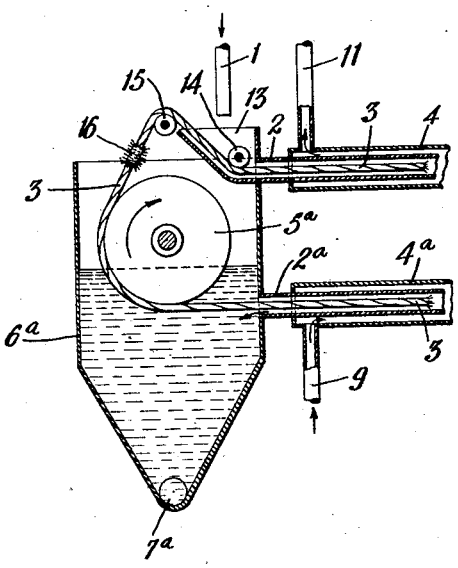
INVENTOR
JOHN SKOGMARK
BY Bruce. K. Brown
ATTORNEY Patented May 10, 1932

1,857,884

UNITED STATES PATENT OFFICE

JOHN SKOGMARK, OF NEW YORK, N. Y.

PRECIPITATING APPARATUS AND PROCESS

Application filed November 3, 1928. Serial No. 317,096.

My invention pertains to an improvement in apparatus and processes whereby salts or other soluble material, the solubility of which varies with the temperature, are precipitated from solution by changing the temperature of the latter. More particularly, my invention relates to an improved apparatus and process in which the necessary temperature change of the solution may be effected by heat transfer in a tubular member or pipe of any desired diameter without clogging the pipe or impairing the flow of the solution as the result of the formation of the precipitate therein. My invention further relates to an apparatus and process in which the heat transfer of the liquid is aided by creating a turbulence in the solution flowing through the tubular member or pipe, and in which crystallization may be promoted by the disposition of seed crystals in the solution througout the length of said tubular member. Other purposes and advantages of my invention will later become apparent.

Efficient heat transfer is a requisite to the practical operation of processes for the precipitation of solids from solution by effecting a temperature change in the solution. In order to secure efficient heat transfer it is necessary that the liquids which are being heated or cooled have a velocity (with respect to the heat transfer surface) above a certain minimum value, which value may be assumed to be about five feet per second. In order to obtain this velocity a rather small pipe or tube must, in most cases, be used. In order to obtain sufficient heat transfer at the temperature differences available for most operations, a large heat transfer area is required and this can be obtained, in a pipe of small diameter, only by the use of a considerable length of pipe.

For the reasons indicated, an apparatus for the precipitation of solids from solutions by temperature changes imparted to the latter usually takes the form of one or more long pipes of small cross-section through which the solution undergoing heat transfer must flow. While such an apparatus is efficient from a thermal viewpoint, great practical difficulty is experienced in operation due to the precipitation of the solids in the pipes of small cross-section. The precipitation of the solids on the internal walls of the pipes reduces the efficiency of heat transfer and also reduces the cross-sectional area of the pipe and thus restricts the flow. In addition to these difficulties, the precipitate in the pipe may become so bulky that it ceases to be carried along in the flow of the solution, in which case "bridges" may develop and the flow of solution may be retarded or stopped entirely.

In accordance with my present invention a part concentrically disposed within a tubular member in an apparatus of the type described is caused to move axially to the tubular member to prevent the latter from being clogged with precipitate. This moving part also has the effect of creating a turbulence in the solution, and thus promotes heat transfer. This part preferably moves longitudinally through the tubular member in the direction in which the solution is flowing and hence serves to assist in propelling the liquid and precipitate through the tubular member.

In the preferred embodiment of my invention this moving part takes the form of an endless flexible wire rope which travels longitudinally through the tubular member in the direction in which the solution flows and thus serves to promote heat transfer by imparting turbulence to the solution. It also prevents clogging and assists in propelling the solution and precipitate through the tube.

Further details of my invention may best be understood by reference to the drawings accompanying this specification. Fig. 1 of the drawings shows, schematically, a cross section of an apparatus of the type described. Fig. 2 shows a modification of one end of the device of Fig. 1. The operation of this apparatus will now be described in connection with its use in a process for the precipitation of a salt, such for example as potassium chloride, from an aqueous solution by cooling said solution.

In the Fig. 1 of the drawings, (2) and (2a) are pipes or tubular members adapted to contain the solution undergoing treatment. These pipes are jacketed by pipes (4) and (4a) respectively. A cooling fluid such as water is circulated in the annular spaces between pipes (2) and (4) and pipes (2a) and (4a). In the apparatus of the drawings this cooling fluid enters the system through inlet pipe (9) and after passing through the annular space between pipes (2a) and (4a) it rises through pipe (10) and travels in the annular space between pipes (2) and (4), leaving the system through outlet (11).

The solution undergoing treatment enters the system at inlet (1) and travels through pipe (2) during which time solids are precipitated from it due to transfer of heat from the solution through the walls of pipe (2) to the cooling liquid in the annular space. The resultant mixture of solution and precipitate is discharged by pipe (2) into settling tank (6) where the precipitate settles to the bottom and may be removed through salt valve (7). Pipe (2a) is connected to tank (6) at a point below the normal liquid level.

The supernatant liquid in tank (6) travels through pipe (2a) and during its passage further solids are precipitated from it as the result of the cooling action of the fluid in the annular space between pipes (2a) and (4a). Pipe (2a) discharges into settling tank (6a) whereupon the precipitated solids settle to the bottom of the tank. These solids may be removed through salt valve (7a). Settling tank (6a) is equipped with a solution outlet (8) through which the supernatant liquid is removed and by means of which the flow of liquid from tank (6) to tank (6a) is sustained.

An apparatus of the type thus far described, while theoretically operable and thermally efficient, would not be practically useful for the reason that pipes (2) and (2a) would quickly become clogged with precipitate. This difficulty is overcome by means of a moving part (3) which, in the drawings, takes the form of an endless flexible wire rope. This rope, which travels through pipes (2) and (2a), is supported by sheaves (5) and (5a) and is caused to move in said pipes by the rotary motion of one or both sheaves which are actuated by any convenient source of power. The rope (3) is preferably caused to travel through the pipes (2) and (2a) in the direction of the flow of the solution. The presence of this moving part in the solution undergoing heat transfer in pipes (2) and (2a) has several advantages. It creates a turbulence in the solution which assists in heat transfer. It serves to prevent bridging of precipitate in the pipes and it also assists in propelling the mixture of solution and precipitate through pipes (2) and (2a) into tanks (6) and (6a) respectively. A further important process advantage attendant on the use of the rope (3), when the apparatus is employed for the precipitation of crystalline material, lies in the fact that it soon becomes covered with tiny crystals. Fresh solution is of course continuously flowing into the apparatus and the crystals present on the rope serve as "seeds" for further crystallization.

In Fig. 1 of the drawings (12) is a packing gland through which the rope (3) enters the pipe (2). In Fig. 2 of the drawings a cross section of an alternative structure is shown which permits the entry of rope (3) into pipe (2) without the use of a packing gland. In Fig. 2, the rope (3) emerging from pipe (2a) travels around sheave (5a) as in Fig. 1, but instead of passing directly into pipe (2) it rises over sheave (15) and then travels downward and contacts with sheave (14) after which it enters pipe (2). Pipe (2) opens on an irregularly shaped cup (13) which is kept full of solution by means of inlet pipe 1. This modified structure not only eliminates the inevitable leakage that occurs in a packing gland such as is embodied in the structure shown in Fig. 1 but it also permits the use of a rope of varying cross section.

When the apparatus is continuously employed in certain types of precipitating operations, a coating of precipitate may form on the inner walls of pipes (2) and (2a). Such a coating reduces the efficiency of heat transfer. This coating may be easily removed by attaching wire brushes or scrapers to the rope (3) and running them through the pipes. When the apparatus includes a rope entry device of the type shown in Fig. 2 wire brushes may be permanently attached to the rope and may thus form a part of the device in normal operation. Such a brush is shown as (16) in Fig. 2 of the drawings. These brushes not only serve to remove coatings of precipitate from the tube walls but they also aid in propelling the mixture of solution and precipitate through the tubes (2) and (2a).

While I have described my invention in connection with the precipitation of crystalline potassium chloride by cooling an aqueous solution of the same, the apparatus and process is equally applicable to the precipitation of solids characterized in having a decreasing solubility with increasing temperature. In such cases, the cooling fluid which travels in the annular spaces between pipes (2) and (2a) and (4) and (4a) respectively is replaced by a hot fluid and the heat transfer is one in which the solution flowing through pipes (2) and (2a) is increased in temperature.

While I have described my invention in connection with its use on aqueous solutions, it is of course equally applicable for use with non-aqueous solutions; though, if the solvent employed is a volatile one, the settling tanks (6) and (6a) should of course be sealed to the air to prevent loss.

Numerous modifications may be made in the apparatus without departing from the spirit of my invention. For example it is evident that where the quantity of liquid to be treated necessitates the use of more than one set of tubes, several similar sets may be located side by side, using sheaves with the required number of grooves for the plurality of ropes. On the contrary under certain conditions it may be advantageous to use only one set of pipes and to allow the rope to run free in the return direction.

While the preferred structure embodied in the drawings shows the use of a counter current flow of heat transfer liquid (whether cold or hot) it is evident that the apparatus may be arranged so that different liquids may be used for cooling in different parts of the run. For example, the liquid entering at (9) may be removed at (10) and the overflow liquid at (8) may be entered at (17) to be reheated in counter current with the warm liquid, or any other division of the path of the cooling (or heating) liquid may be made by providing proper inlets and outlets in pipes (4a) and (4) and by providing barriers in the annular spaces.

While in the preferred embodiment of my invention the rope (3) travels continuously in the direction of flow of the liquid undergoing treatment, it is sometimes advantageous to give it a reciprocating motion and this may of course be done by means of a suitable driving mechanism on one or more of the sheaves. If a reciprocating motion is applied to the rope brushes may be employed thereon without the necessity for their rather frequent replacement that is encountered when the brushes must pass over the sheaves.

It is not desired to limit the invention to the details and examples herein described, since it will be obvious to those skilled in the art that various other modifications and substitutions may be made without departing from the scope of the invention.

I claim:

1. In an apparatus for the precipitation of solids from solution, a tubular member, means for causing a solution to flow through said member, means for effecting the precipitation of solids from the solution flowing within said tubular member, a part concentrically disposed within said tubular member, and adapted to move longitudinally in said tubular member to prevent the clogging of said member by precipitated solids, said moving means being adapted to enter the precipitating member above the level of the liquid therein.

2. In an apparatus for the precipitation of solids from solution, a tubular member, means for causing a solution to flow through said member, heat transfer means for effecting the precipitation of solids within said tubular member, and a flexible endless part adapted to move longitudinally within said tubular member.

3. In an apparatus for the precipitation of solids from solution, a tubular member, means for causing a solution to flow through said member, heat transfer means for effecting the precipitation of solids within said tubular member, and a flexible endless part adapted to move longitudinally within said tubular member in the direction of the flow of the solution.

4. An apparatus of the class described in claim 3 in which said flexible part is equipped with brushes of substantially the same diameter as the internal diameter of the tubular member.

5. In an apparatus for the precipitation of solids from solution, a tubular member, means for causing a solution to flow through said member, means for causing the precipitation of solids within said tubular member by heat transfer through said member, and a flexible endless part adapted to move longitudinally within said tubular member, said flexible part being equipped with a brush of substantially the same diameter as the interior of the tubular member.

6. An apparatus for the precipitation of solids from solution comprising a plurality of tubular members, means for causing a solution to flow through said members, heat exchange means for effecting the precipitation of solids from the solution within said members, and a flexible endless part adapted to travel through said tubular members.

7. An apparatus of the class described in claim 6 in which said flexible part is equipped with brushes of substantially the same diameter as the internal diameter of the tubular members.

8. In an apparatus for the precipitation of solids from solutions by cooling said solutions, a tubular member, means for causing a hot solution to flow through said member, means for cooling the outside of said tubular member to effect the cooling of the solution therein by heat transfer, and a flexible endless part adapted to move longitudinally within said tubular member.

9. In an apparatus for the precipitation of solids from solutions by cooling said solutions, a tubular member, means for causing a hot solution to flow through said member, means cooling the outside of said tubular member to effect the cooling of the solution therein by heat transfer, and a flexible endless part adapted to move longitudinally within said tubular member in the direction of the flow of the solution.

10. An apparatus of the type described in claim 9 in which said flexible part is equipped with brushes of substantially the same diameter as the internal diameter of the tubular member.

11. In a process in which solids are precipitated from solution by passing said solution through a tubular member while effecting a heat transfer, the step which comprises causing a rope to travel through said member to effect a turbulence in said solution and to assist in propelling the mixture of solution and precipitated solids through said tubular member.

12. In a process in which solids are crystallized from solution by passing said solution through a tubular member while effecting a heat transfer, the step which comprises causing a wire rope carrying said crystals thereon to travel through said solution in said tubular member to promote crystallization, to effect a turbulence in said solution, and to promote the passage of solution and crystalline precipitate through said tubular member.

13. In an apparatus of the class described, a tubular member, a second tubular member having its inlet end positioned at a level below the outlet of the first member, a container connected to the inlet end of the second tubular member at a point below the normal level of liquid in the container, said container being positioned to receive the outflow from the first tubular member and having a settling chamber below the inlet for the second tubular member, and means moving concentrically within said tubular members to prevent clogging by precipitated solids.

14. An apparatus as described in claim 13 in which an endless member moves continuously through said tubular members.

15. In an apparatus of the class described, a substantially horizontal tubular member having an inlet opening above the normal level of liquid therein, means for effecting the precipitation of solids from liquid within the tubular member, and an endless member adapted to enter the tubular member through the said inlet and to move longitudinally through the tubular member to prevent clogging of the member by precipitated solids.

16. An apparatus as described in claim 15 in which the endless member is equipped with brushes of substantially the same diameter as the interior of the tubular member.

17. In the crystallization of salts from their solutions, the step comprising passing the solution through a heat interchanger while causing a portion of an endless band to continuously travel through the solution within the interchanger.

18. In the crystallization of salts from their solutions, the steps comprising passing the solution through a heat interchanger at a rate of more than 5 feet per second while causing a rope to travel through the solution in the interchanger in the same direction as the flow of the liquid therein.

19. In an apparatus for crystallizing solids from solutions, a pair of substantially horizontal tubular members, means for conveying liquid to one of said tubular members and from that one to the other, a separating tank connected to the outlet of the second tubular member, means for effecting heat transfer while the solution is passing through said tubular members, and flexible means adapted to move through the solution in said tubular members and agitate the solution therein.

In testimony whereof, I have signed my name to this specification this 1st day of November, 1928.

JOHN SKOGMARK.